No. 850,336. PATENTED APR. 16, 1907.
J. BIM.
WEFT REPLENISHING MECHANISM FOR LOOMS.
APPLICATION FILED DEC. 30, 1904.

Witnesses:

Inventor:
Josef Bim
by H. van Oldenneel
Attorney

No. 850,336. PATENTED APR. 16, 1907.
J. BIM.
WEFT REPLENISHING MECHANISM FOR LOOMS.
APPLICATION FILED DEC. 30, 1904.

No. 850,336. PATENTED APR. 16, 1907.
J. BIM.
WEFT REPLENISHING MECHANISM FOR LOOMS.
APPLICATION FILED DEC. 30, 1904.

Witnesses:

Inventor:
Josef Bim

No. 850,336. PATENTED APR. 16, 1907.
J. BIM.
WEFT REPLENISHING MECHANISM FOR LOOMS.
APPLICATION FILED DEC. 30, 1904.

Witnesses:

Inventor:
Josef Bim

No. 850,336. PATENTED APR. 16, 1907.
J. BIM.
WEFT REPLENISHING MECHANISM FOR LOOMS.
APPLICATION FILED DEC. 30, 1904.

Witnesses:

Inventor:
Josef Bim
by H. Van Oldemeel
Attorney

THE NORRIS PETERS CO., WASHINGTON, D. C.

No. 850,336. PATENTED APR. 16, 1907.
J. BIM.
WEFT REPLENISHING MECHANISM FOR LOOMS.
APPLICATION FILED DEC. 30, 1904.

WITNESSES;
George G. Schoenlank
W. H. Berrigan

INVENTOR,
JOSEF BIM,
By H. van Oedenneel
Attorney—

No. 850,336. PATENTED APR. 16, 1907.
J. BIM.
WEFT REPLENISHING MECHANISM FOR LOOMS.
APPLICATION FILED DEC. 30, 1904.

WITNESSES.
George G. Schoenlank.
W. H. Berrigan.

INVENTOR,
JOSEF BIM,
By H. Van Olsenneel
Attorney—

UNITED STATES PATENT OFFICE.

JOSEF BIM, OF VIENNA, AUSTRIA-HUNGARY, ASSIGNOR TO UNION BANK, OF VIENNA, AUSTRIA-HUNGARY.

WEFT-REPLENISHING MECHANISM FOR LOOMS.

No. 850,336.   Specification of Letters Patent.   Patented April 16, 1907.

Application filed December 30, 1904. Serial No. 238,950.

*To all whom it may concern:*

Be it known that I, JOSEF BIM, a subject of the Emperor of Austria-Hungary, residing at Kolingasse 19, Vienna, Austria-Hungary, have invented new and useful Improvements in Weft-Replenishing Mechanism for Looms, of which the following is a specification.

The present invention relates to looms such as are provided with an automatic arrangement for changing the weft-bobbins in the shuttle without stopping the loom. In such looms the bobbins are pushed or forced singly out of a magazine or holder at the proper time into the shuttle placed underneath it and the bobbin which had previously been in use and held fast in the shuttle is pushed out by the fresh bobbin through an opening in the bottom of the shuttle and carried away. The fresh bobbin is held fast in the shuttle by means of a spring until a further change of bobbins takes place.

These improvements relate to a construction of bobbin-magazine for looms of the above description and to the mechanism connected therewith for automatically actuating the bobbin changing or charging mechanism.

In the looms hitherto in use the position and arrangement of the magazine have been such that the projecting bottom end thereof which held the undermost bobbin ready for use was turned to face the breast-beam, whereas the real magazine was behind the projecting end and turned toward the slay or batten. In such arrangement the shuttle-box carried by the slay or batten must at every forward movement travel under the magazine until it reaches the position where the bobbin lies ready for insertion therein. Irrespective of the fact that during the time the shuttle-box is under the magazine, the space above the shuttle-box is unnecessarily blocked, and there is the further drawback that the same automatic bobbin-changing mechanism cannot be used for overpick-looms. For this reason automatic bobbin-changing mechanism has hitherto only been applied to underpick-looms.

In order that the slay with the shuttle-box may be under the bobbin-magazine only for a short portion of its travel and to insure space at the same time for the overpick-arm, by this invention the magazine-box with its projecting bottom part, which contains the lowermost bobbin ready for the shuttle, is turned toward the slay. As the slay in its forward movement has only to travel as far as the bottom projecting part of the magazine it is necessarily out of reach of the magazine by the time the overpick-arm throws the shuttle out of the shuttle-box. As the picker comes into action shortly after the backward motion of the slay has commenced, the use of an overpick is only practicable when, as in the present invention, the slay only travels as far as the lower free end of the bobbin-magazine, which is turned toward the slay.

In order to make the bobbin-magazine available for various kinds and sizes of looms, it is constructed so that it can be adjusted on the frame of the loom in three different planes at right angles to one another. This is particularly essential when it is desired to convert ordinary looms into looms with automatic bobbin-changing mechanism.

The charging mechanism for pushing the bobbins into the shuttle is so far of such a special construction that all the parts directly connected with same are fitted upon and under the magazine. By this arrangement not only is much space gained, but also the important result is achieved that an ordinary loom is easily converted into one with automatic bobbin-changing mechanism, as all the important parts for the bobbin-changing mechanism are fitted upon the magazine.

In the accompanying drawings I have shown preferred embodiments of my invention.

Figures 1–19 illustrate detail views of parts detached, while Figs. 20 and 21 are views, from the right and left hand sides, of the parts assembled in working relation. Figs. 8 to 19 show the charging mechanism, the connections for operating the same, and diagrammatically the different positions of said parts.

Figure 1:
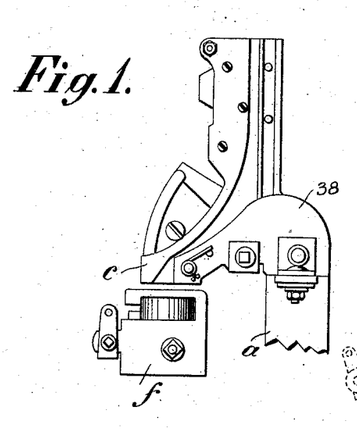
Fig. 1 is a side elevation of the magazine detached as seen from the left side of the loom.
Figures 2, 4:
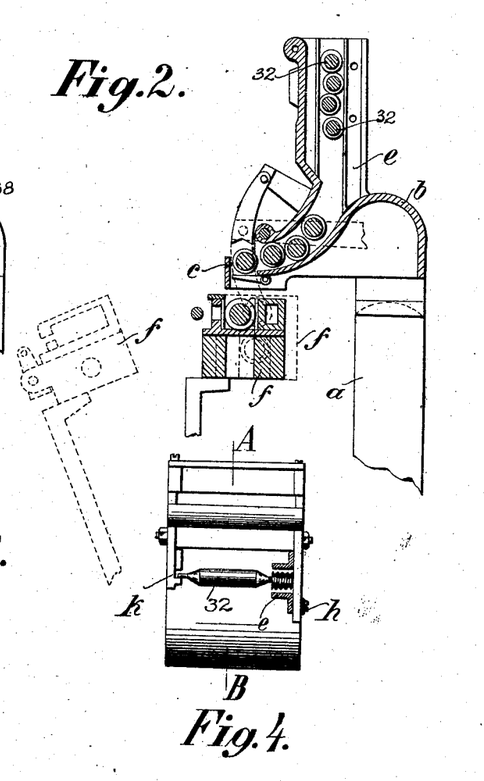
Fig. 2 is a vertical section thereof on line A B of Fig. 4.
Fig. 4 is a plan of the magazine.
Figure 3:
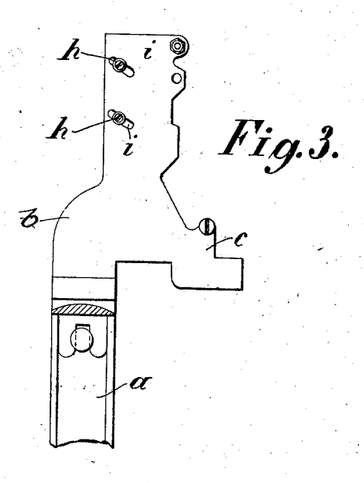
Fig. 3 is a side elevation of the magazine from the right side.
Figure 14:
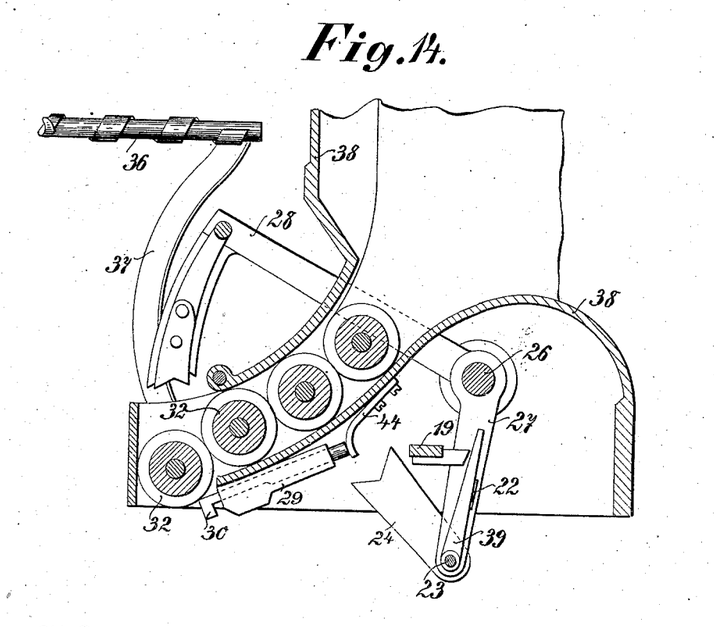
Fig. 14 is a vertical section of the bottom part of the magazine on an enlarged scale, the hammer being shown in a raised position.

On the side $a$, Figs. 20, 21, 1, 2, 3, 5, and 6, of the loom-frame the magazine 38 is fixed in such a way that its bottom projecting end $c$, which contains one of the bobbins 32, Figs. 2 and 14, is turned toward the slay $f$ of the loom. Three different positions of the slay $f$ are shown by dotted and full lines in Fig. 2. The two positions indicated by dotted lines are the two extreme ones, while the position of the slay shown by solid sectional lines is that in which during the change of bobbins the lowermost bobbin in the projecting end $c$ is being pushed by the filling-hammer 28 (see also Figs. 16 and 21) into the shuttle in the shuttle-box.

Figure 20:
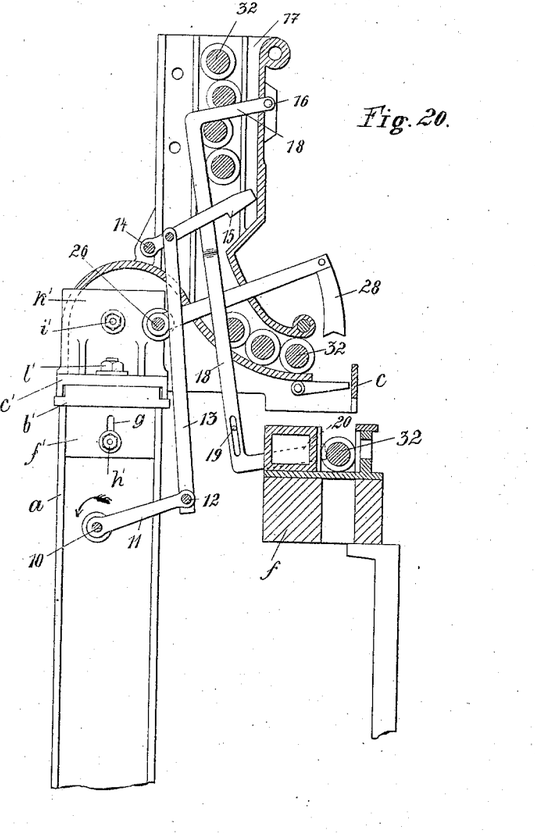
Figs. 20 and 21 are partly sectional views from opposite sides of the assembled apparatus in the charging position and in the at-rest position.
Figure 21:
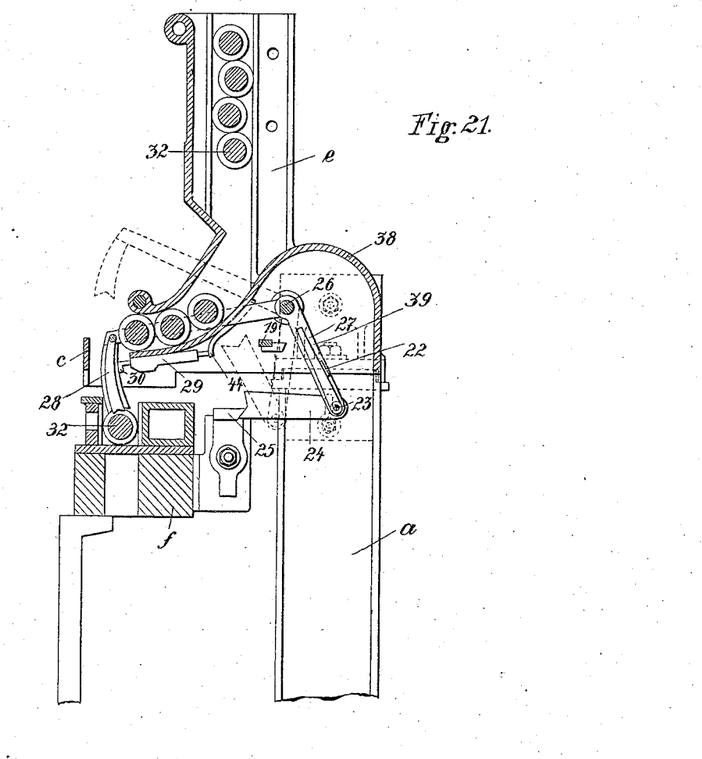

The bobbins 32 lie one after another with the point of the bobbin spindle or peg in a narrow guide-channel $k$, Fig. 4, and the base of the bobbin spindles or pegs lie zigzag one upon the other in a channel between angle or other bars $e$, as shown in Figs. 2, 20, and 21. One of the bars $e$ may be adjusted by means of screws $h$, Figs. 3 and 4, which pass through inclined slots $i$ in the side of the magazine. By simply loosening the screws $h$ and moving the angle-iron $e$ the width of the channel can be altered and adjusted to the bobbin-pegs then in use. Of course several rows of the bobbins $d$ and of the guide-bars $e$ and guides $k$, Fig. 4, can be used.

In every case it is important that the space beyond the farthest projecting end of the picker-arm of the overpick motion should remain free, as otherwise it could not be utilized at all. In order to facilitate this, I make the bobbin-magazine adjustable in three directions, and the arrangement shown in Figs. 20, 21, 5, 6, and 7 has been devised. On the left side of the loom above the breast-beam $a'$, Fig. 5, a bed-plate $b'$ is fixed, and this is fitted with a guide-plate $f'$ on the side $a$ of the loom-frame. On the bed-plate $b'$ a slide $c'$ is fitted, and by loosening a nut $l'$ this slide can be moved in a direction longitudinally of the breast-beam $a'$. Further, by loosening a nut $h'$ the guide-plate $f'$ on the side $a$ can be moved up and down, and by loosening a nut $i'$ the magazine $d'$, (38 in Figs. 20, 21, 1, and 2,) which serves as a receptacle for the bobbins, can be moved backward or forward in the direction of the warp-threads. The whole bobbin-magazine is therefore supported by the side $a$ of the loom so that it can be adjusted in three directions at right angles to each other, and the construction is such that the displacement of the magazine can take place for a considerable distance in each direction. The magazine can thus be moved either up or down in the direction of the width of the cloth and also either backward or forward. By this means the magazine can be applied to the most varied kinds and sizes of looms. As the plate $f'$ carries all the other parts and every loom has the side $a$ any ordinary loom can be fitted with the magazine in a very short time and in such a way that it will be placed in the necessary position for producing the proper effect. If the length of the stroke of the slay has to be altered, as is sometimes the case, the alteration can easily be compensated for by loosening the nut $i'$ and moving the magazine $d'$ in the dovetail groove $k'$ of the slide $c'$ in the direction of the warp-threads.

Figure 5:
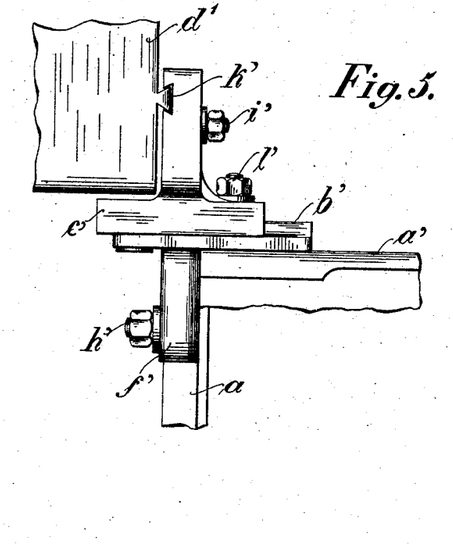
Fig. 5 is a partial front elevation of the left side of the loom looking toward the breast-beam and showing the magazine-adjusting devices.
Figure 6:
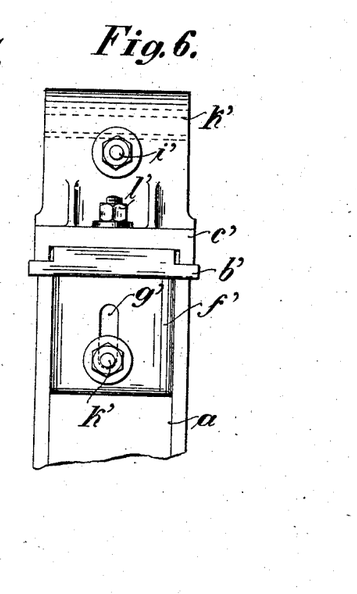
Fig. 6 is a side elevation of Fig. 5 looking from the right.
Figure 7:
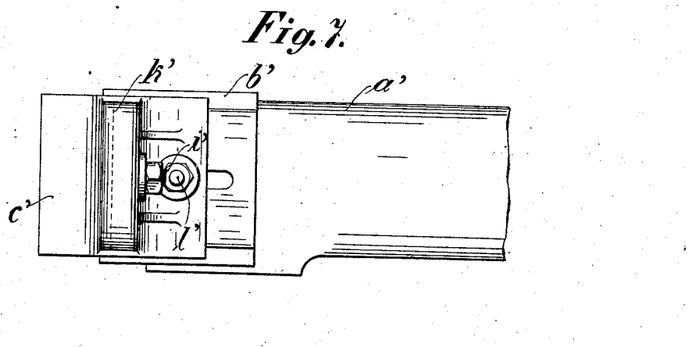
Fig. 7 is a plan of Fig. 5.

In the construction shown in the drawing Fig. 5 the magazine is supported in a similar way to a slide-rest, except that in the present case after the magazine has been brought into the desired position it is held fast there.

The mechanism for inserting the bobbins into the shuttles and ejecting the empty shuttle-peg will next be described. The combination of such mechanism with the other parts is shown in Figs. 20 and 21, and the charging and ejecting mechanism is shown in detail in Figs. 8–19, inclusive.

Below the breast-beam of the loom a shaft or spindle 10 is journaled, which is caused by any suitable method to make a partial revolution when it is desired to set the mechanism in motion to bring a fresh bobbin into the shuttle. The shaft 10 carries an arm 11, which is attached by a pin or by a pivoted joint 12 to a rod 13 and is connected to a pivoted latch 15, Figs. 8, 9, 20, by a pin 14. When the shaft 10 is partly rotated in the direction of the arrow, Figs. 20 and 8, the parts 11 and 13 are raised (into the position shown by the dotted lines in Fig. 8 and by solid lines in Fig. 20) and lift the latch 15, so that it releases a cranked feeler-lever 18. This cranked feeler-lever is pivoted on pin 16 to the side 17 of the magazine and engages, by means of a slot near its bottom end, with the free end of a lever 19. A lever 19, Figs. 20, 21, 8, 9, 10, 14, 15, and 16, is pivoted under the bottom of the magazine on a pin 21 and engages or comes into contact with a lever 39, Figs. 21, 9, 10, 14, and 16, which is actuated by a strong spring 22. Said spring tends to swing lever 19 into the position shown by the dotted line in Fig. 9, but is prevented from doing so when lever 18 is held fast by the catch 15 in the position shown by the full lines in Fig. 8. When the latch 15 is raised in the manner previously described and the lever 18 thereby released, the lever 19 swings into the position shown by the dotted line, Fig. 9, by the pressure of the spring 22 acting upon the lever 39.

Figures 15, 16:
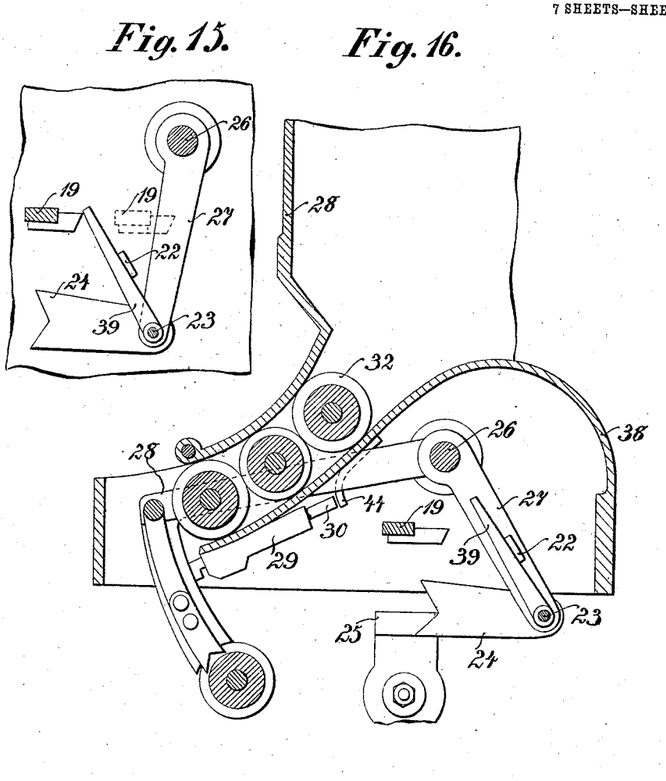
Fig. 15 is a detail showing the action of the projecting arm 24.
Fig. 16 is a vertical section corresponding to Fig. 14 and showing the position of the hammer and connecting parts when removing a bobbin from the magazine.

The spring 22 displaces not only the lever 19, but also causes the spindle 26, which operates the supply-hammer, to rotate, Figs. 20, 21, 9, 10, 14 to 16, and for this purpose the lever 39, against which spring 22 presses, is fixed upon a pin 23, carried at the outer end of the lever 27, by which it is connected with a projecting arm 24, Figs. 20, 21, 14, 15, and 16. Before the lever 18 and spring 22 are set free the lever 39 and the arm 24 are in the position shown in Fig. 14 and in dotted lines in Fig. 21. Now as soon as the latch 15 is raised, Fig. 20, the spring 22, Figs. 21 and 16, causes the lever 39 to swing out, and thus bring the lever 19 out of the position shown by the dotted lines in Fig. 15 into that shown by the full lines. The arm 24 is also simultaneously moved to the position shown in Fig. 15 into the path of a striker 25, attached to the slay. In this position striker 25 as the slay advances comes into contact with the arm 24, as shown in Figs. 21 and 16, and simultaneously carries the arm 24, with the lever 27, forward, so that the latter partly rotates the spindle 26, on which it is firmly fixed, from the position shown in Figs. 20 and 14 to that shown by full lines in Figs. 21 and 16.

Figure 8:
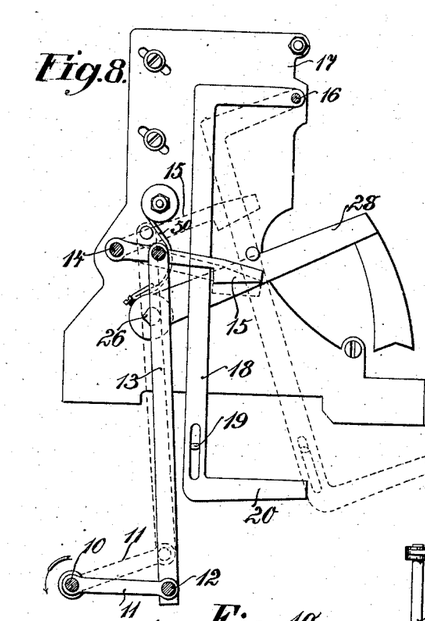
Fig. 8 is an enlarged detail side elevation of the magazine.
Figure 9:
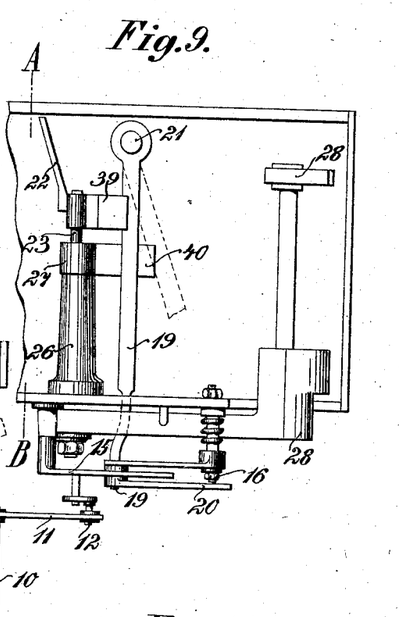
Fig. 9 is a plan of the last-named parts.
Figure 10:
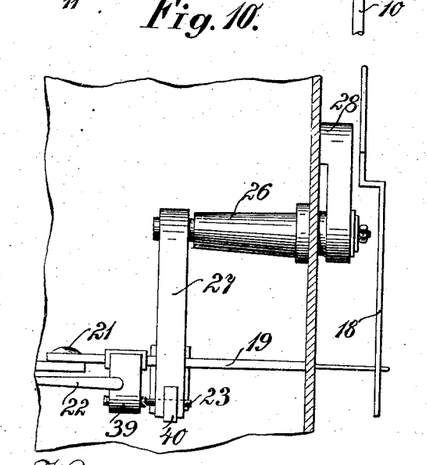
Fig. 10 is a vertical section on line A B of Fig. 9.

Directly at the side of the magazine-case the part of spindle 26 which projects from the same carries the weft-bobbin hammer 28, working against a spring 50, Fig. 8, which, as can be seen from Figs. 21 and 16, after the arm 24 has been displaced, is depressed by the striker 25, into the path of which it has been carried by the movement of spindle 26.

The spindle 26, as well as the lever 27, connected to it, and the arm 24, the lever 39, and the spring 22 are journaled right under the bobbin-magazine, are easily accessible, and the entire mechanism, being very compact, takes up but little room.

As soon as the arm 24 (after the latch 15 has been raised) has been brought into the position shown in Fig. 15 and the slay travels forward the striker 25, attached to the slay, strikes the arm 24 and pushes said arm back and by means of the lever 27 oscillates the spindle 26. The bobbin-hammer 28 is moved downward by said spindle 26 and (leaving the position shown in Figs. 20 and 14) assumes the position shown in Figs. 21 and 16, in doing which it presses the lower bobbin 32 into the shuttle directly underneath, and the empty bobbin-peg is thrust out of the shuttle in the usual manner. During its downward motion the bobbin-hammer 28 (see Figs. 21 and 16) partly closes the discharge-opening of the magazine, thereby preventing the next bobbin 32 from slipping out. At the same time the bobbin-hammer also presses back a slide 30 against a spring 44 and also releases it again when the bobbin-hammer has been brought back into its original position by the action of spring 22, which occurs only when the striker 25 has receded from the arm 24 on the return movement of the slay. The removal of the bobbin-hammer 28 then leaves the course free, so that the next weft-bobbin can slide down and take up the undermost position, (see Figs. 2 and 14,) in which position it is at once held by slide 30, the latter being pressed forward by spring 44.

On the forward swing of the slay and while the arm 24 is being carried with it by the striker 25 the pressure of the spring 22 against the lever 39, which is firmly connected with the arm 24, is relaxed upon the lever 19, which then being unsupported is caused, either by the weight of lever 18 or by a spring acting upon it, to swing back into its original position. (Shown in Figs. 8 and 16 and in the dotted lines in Fig. 15.) The lever 18 at the same time assumes the position indicated by full lines in Fig. 8, and the latch 15 falls down and again locks it and lever 19, so that when the slay swings back and the arm 24 and striker 25 are disengaged all the parts resume their original position, as shown by full lines in Figs. 20 and 14 and by dotted lines in Fig. 21.

On the swinging back of lever 18, which (as already mentioned) tends to resume its original position either by the force of its own gravity or by means of a spring, the effect of spring 22 must be nullified, because this spring is sufficiently strong to move the lever 18 into the position shown by dotted lines in Fig. 8 and also at the same time to move the arm 24 into the position where it is ready for action. At the moment when the striker 25 engages the arm 24 and carries it along with it on the forward motion of the slay, the spindle 26 (see Figs. 21 and 16) is oscillated by the agency of lever 27 and the bobbin-hammer 28 moved downward. The spring 22 is pressed back (from the position shown in Fig. 14 to that shown in Fig. 16) by the lever 39, and it is bodily carried away from the lever 19. As soon as this occurs, the lever 18 being no longer prevented by spring 22, can swing back (from the position shown in Fig. 20) into the position shown by continuous lines in Fig. 8, and at the same time carries lever 19 with it, which latter being locked temporarily brings back the lever 39 into the position shown in Fig. 14 and thereby raises the arm 24, thus throwing it out of the path of the striker 25. Before the striker 25 swings back with the slay, and thereby again releases spring 22, all the parts have been secured in their out-of-gear positions by means of the latch 15, which after lever 18 has swung back embraces the crank formed upon it. Only when the shaft 10 is again turned in the direction of the arrow of Figs. 20 and 8 and again raises the latch 15, as before described in detail, does the spring 22 again come into action, displacing levers 19 and 18 and arm 24, so that another change of bobbins can be made.

The angularly-deflected end 20, Figs. 20 and 8, of the lever 18 (which is pivoted upon the side of the bobbin-case 38) assumes such a position upon the release and forward swing of the lever 18 that when the slay moves forward said end is in front of the shuttle-box in the path of the slay and enters the shuttle-race. Now should the shuttle not have been properly thrown into the box or should it have sprung out of same again, so that end 20 of lever 18 knocks against the point of the shuttle, said lever 18 and the controlled lever 19 are held back in such a way that spring 22 cannot move the arm 24 downward. Therefore change of bobbins cannot take place if the shuttle has not properly entered the shuttle-box.

Figure 11:
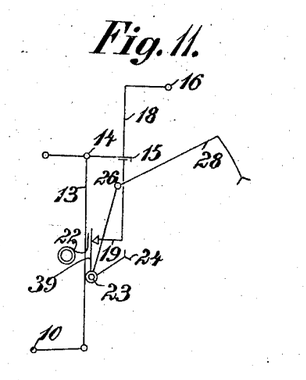
Figs. 11, 12, and 13 are diagrammatic representations of the action of the hammer mechanism.
Figure 12:
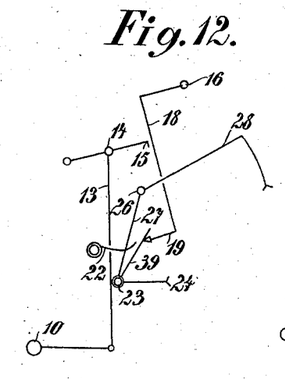
Figure 13:
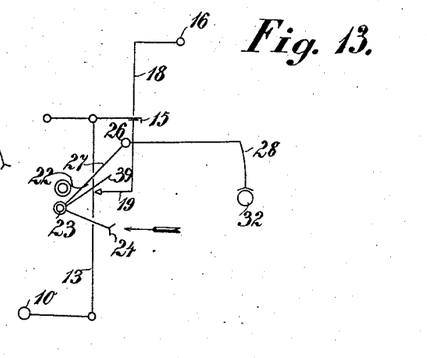

The diagrams Figs. 11 to 13 show the different positions of the parts. In Fig. 11 all the levers and the arm 24 are shown in their non-working position. Spring 22 is under tension. In Fig. 12, owing to the elevation of rod 13, the latch 15 is lifted from the lever 18, so that the spring 22 can and has come into action. Lever 18 swings forward as lever 19 carries it along with it. At the same time arm 24 is moved downward by the arm 39, against which spring 22 presses, and assumes such a position that it can be carried along by the striker 25 (elsewhere shown in detail) on the forward motion of the slay. In Fig. 13 the arm 24 is represented as being carried forward in the direction of the arrow. The hammer 28 is depressed and has thrust a fresh bobbin 32 into the shuttle. While the hammer is moving down, the pressure of spring 22 is removed from the lever 18, which falls back into its non-working position, where it is held fast by the descending latch 15. Immediately after the striker 25 has left the arm 24 both the latter and the bobbin-hammer resume a position of rest, which is brought about by spring 50, Fig. 8, acting upon the hammer 28.

Figure 17:
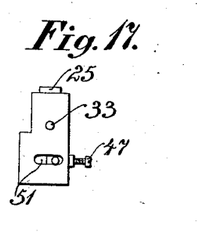
Figs. 17, 18, and 19 are side and front views of the adjustable catch which actuates the filling-hammer.
Figure 18:
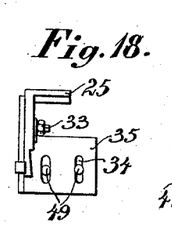
Figure 19:
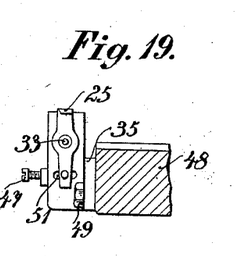

The striker 25 is either non-adjustably attached to the slay *f*, as shown in Fig. 21, or attached to the slay 48 of the loom, so that it may be adjusted in various directions, by means shown in Figs. 17 to 19, wherein the striker is shown as mounted on a stud 33 on a plate 35. Said plate 35 is provided with slots 34 and can be attached to the slay at various heights by the bolts or screws 49 passing through it. By means of the slots 34 the striker 25 can be adjusted to different heights.

What I claim is—

1. A bobbin-magazine, means for discharging bobbins singly therefrom, an oscillating feeler-lever, 18, pivotally connected with said magazine, a latch for engaging and disengaging the oscillating lever aforesaid, and a movable part controlled by the lever 18 and thrown into position to operate the bobbin-discharging means aforesaid.

2. A bobbin-magazine, means for discharging bobbins singly therefrom, an oscillating feeler-lever, 18, pivoted at one side of said magazine, a latch, 15, for engaging and disengaging the oscillating lever aforesaid, a movable shaft for operating said latch, and a movable part controlled by the lever 18 and thrown into position to operate the bobbin-discharging means as aforesaid.

3. A bobbin-magazine, means, including a lever carrying a hammer for discharging bobbins singly therefrom, an oscillating feeler-lever 18, pivotally connected with said magazine, a latch for engaging and disengaging the lever 18, a spring released by said lever 18, and a movable part mounted on the lever which carries the hammer and thrown into position to operate the bobbin-discharging means aforesaid.

4. A bobbin-magazine, means including a lever 27, carrying a hammer, for discharging bobbins singly therefrom, an oscillating feeler-lever, 18, pivoted at one side of said magazine, a latch, 15, for engaging and disengaging the lever 18, a movable shaft, 10, and connections for raising the latch, a lever 19, pivoted beneath the magazine and which engages lever 18, an arm, 24, carried by the lever 27, and connections, including the arm 24 and a striker on the slay of the loom, which coöperate to operate the discharging-hammer aforesaid.

5. Weft-replenishing mechanism for looms, comprising a shuttle-race and shuttle-box, a feeler-lever 18, having an end adapted to enter the shuttle-race in front of the shuttle-box when the shuttle is in proper position, a bobbin-hammer, means for causing the lever 18 to swing back to its original position when the bobbin-hammer descends, and a latch, 15, for holding the lever in said position.

In witness whereof I have hereunto set my hand in the presence of two witnesses.

JOSEF BIM.

Witnesses:
ERNST ROHUERT,
OTTO LÖHL.